United States Patent
Harris et al.

(10) Patent No.: US 11,493,938 B1
(45) Date of Patent: Nov. 8, 2022

(54) COMPUTER VISION WIND DIRECTION FOR UNMANNED AERIAL VEHICLE (UAV) APPLICATIONS

(71) Applicant: Amazon Technologies, Inc., Seattle, WA (US)

(72) Inventors: Scott Raymond Harris, Bainbridge Island, WA (US); Peter Joseph Williams, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 487 days.

(21) Appl. No.: 16/578,256

(22) Filed: Sep. 20, 2019

(51) Int. Cl.
| | |
|---|---|
| G05D 1/00 | (2006.01) |
| G05D 3/00 | (2006.01) |
| G06F 7/00 | (2006.01) |
| G06F 17/00 | (2019.01) |
| G05D 1/10 | (2006.01) |
| B64C 39/02 | (2006.01) |
| B64D 47/08 | (2006.01) |

(52) U.S. Cl.
CPC .............. G05D 1/106 (2019.05); B64C 39/02 (2013.01); B64D 47/08 (2013.01); G05D 1/0088 (2013.01); B64C 2201/141 (2013.01)

(58) Field of Classification Search
CPC ...... G05D 1/106; G05D 1/0088; B64C 39/02; B64C 2201/141; B64D 47/08

USPC ........................................................... 701/11
See application file for complete search history.

(56) References Cited

U.S. PATENT DOCUMENTS

| | | | | |
|---|---|---|---|---|
| 4,058,010 | A * | 11/1977 | Woodhouse | G01P 5/00 |
| | | | | 73/170.15 |
| 11,046,430 | B1* | 6/2021 | Melton | G08G 5/0069 |
| 2018/0101173 | A1* | 4/2018 | Banerjee | G05D 1/0094 |
| 2019/0051195 | A1* | 2/2019 | De La Guardia Gonzalez | |
| | | | | G08G 5/0008 |
| 2019/0135412 | A1* | 5/2019 | Shiosaki | B64C 11/32 |
| 2020/0094948 | A1* | 3/2020 | Adachi | B64C 27/04 |
| 2021/0043092 | A1* | 2/2021 | Tillotson | G08G 5/0013 |

* cited by examiner

Primary Examiner — Mahmoud S Ismail
(74) Attorney, Agent, or Firm — Lee & Hayes, P.C.

(57) ABSTRACT

Image data is used to determine wind speed and wind direction during takeoff and landing by an unmanned aerial vehicle (UAV). The flight data, including image data, may be received using sensors onboard the UAV and/or the flight data may be received from other sources, such as nearby anemometer, cameras, other UAVs, other vehicles, and/or local weather stations. Machine learning models may train using the flight data gathered by the UAVs to determine the wind velocity based on image data. The UAV may adjust flight control settings to generate side forces to overcome the predicted wind velocity.

20 Claims, 6 Drawing Sheets

US 11,493,938 B1

COMPUTER VISION WIND DIRECTION FOR UNMANNED AERIAL VEHICLE (UAV) APPLICATIONS

BACKGROUND

Unmanned aerial vehicles (UAVs) vary in degrees of sophistication. For example, UAVs used by hobbyists often rely completely on receipt of control signals from a user-operated remote-control device. Thus, these UAVs rely on a user to provide most or all navigational instructions. More advanced UAVs may determine some navigational instructions without direct input. These UAVs may receive high level instructions (such as waypoints, a destination, and/or other parameters), and may implement logic to navigate through airspace based on the high-level instructions and other information accessed by sensors on the UAVs. For example, some UAVs may access global positioning satellite (GPS) systems to obtain current location information while some UAVs may communicate with a command station using a mobile telephone network to exchange information, log events, and for other reasons.

Due to the physical attributes and design of many UAVs, weather may have a large impact on an ability of some UAVs to perform specified tasks, such as travelling to a predetermined destination and landing on/at a specific location. For example, when a UAV is subjected to high winds and/or gusty winds, the UAV may not be able to maintain a heading or maintain accuracy when landing (or taking off). In particular, UAVs that rely on multiple rotors that are generally oriented to support hover flight may experience acute difficulty when pushed by side forces from strong winds. Precipitation, including heavy rain, snow, sleet, and freezing rain may also impede landing accuracy of a UAV.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
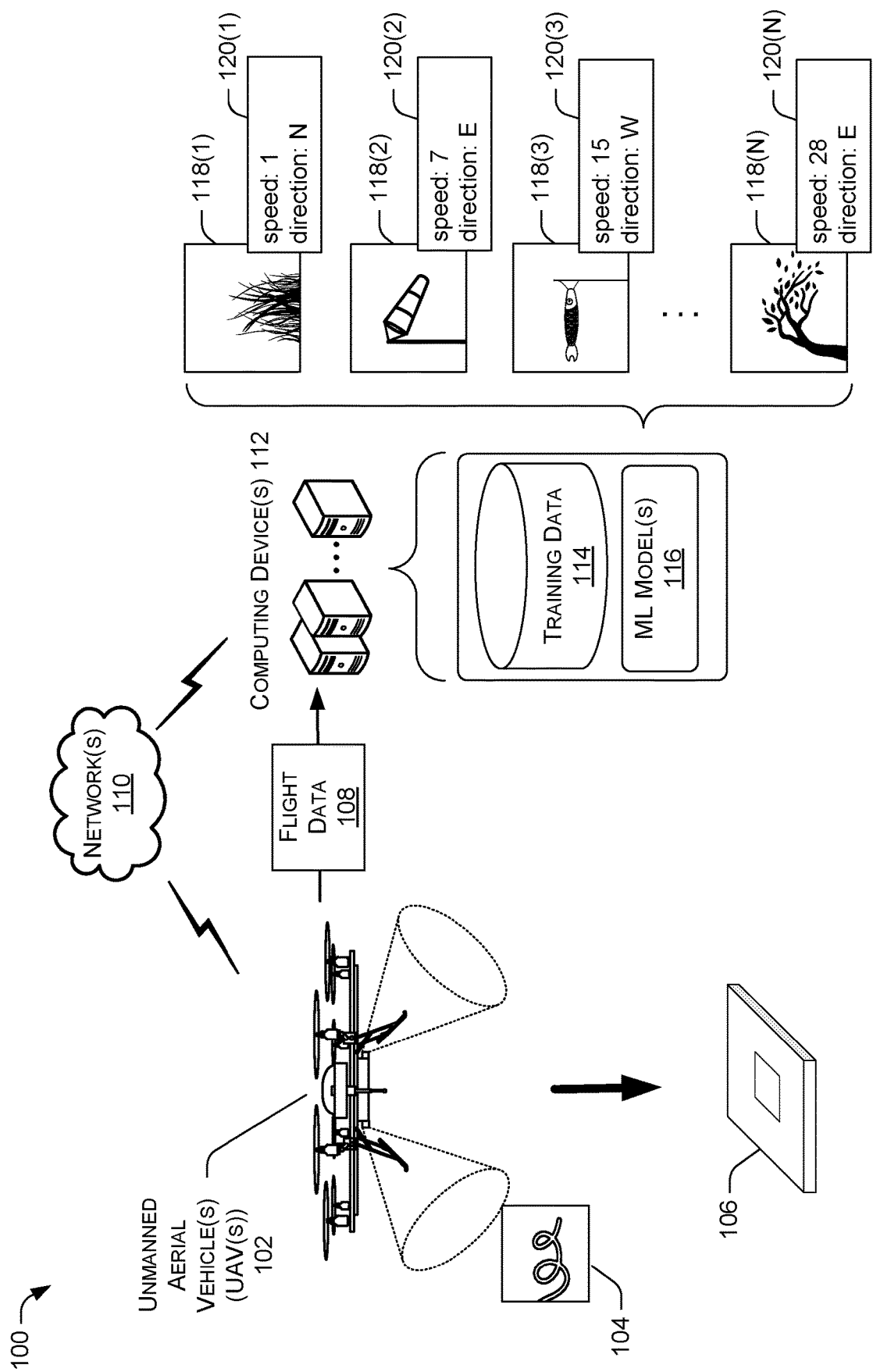
FIG. 1 is a schematic diagram of an illustrative environment that includes an unmanned aerial vehicle (UAV) collecting flight data including image data indicating wind velocity and landing accuracy and sending the flight data to computing device(s) for analysis.

This disclosure is directed at least partly to a vision-based wind estimation system for analyzing image data to determine wind velocity at a landing location and determine flight control settings to use during descent for an unmanned aerial vehicle (UAV). The determined flight control settings may include tilting, or otherwise adjusting the orientation of, the UAV in response to the wind conditions identified in image data. The image data may be received using sensors onboard the UAV and/or the image data may be received from other sources, such as nearby cameras, other UAVs, other vehicles, and/or local weather stations (e.g., weather poles, weather balloons, etc.). The UAVs may then use this current image data, which may be real-time image data or near real-time image data. As discussed herein, the term "real-time" image data is intended to include "near real-time image data" unless otherwise indicated. The near real-time image data may include delays accounting for latency due to data transfer and processing, and/or similar delays or latency.

Initially, data generated by unmanned aerial vehicles (UAVs), may be transmitted to a server device to train a machine learning model. With the initial training data sets, the server device may train one or more machine learning (ML) model(s) to generate a vision-based wind estimation algorithm and a landing control algorithm. The server device may deploy the latest version of algorithms including the vision-based wind estimation algorithm and the landing control algorithm as generated by the trained ML model(s) to UAVs. The UAVs running the latest version of vision-based wind estimation algorithm may determine an estimate wind speed and wind direction from images of the UAV's currently landing location, or images that depict a landing area in proximity (e.g., within a threshold distance from) the landing location. Based on the estimated wind speed and wind direction, as well as a current altitude of the UAV, the landing control algorithm may determine an adjustment to the orientation of the UAV during descent and/or landing.

It is to be appreciated that, autonomously landing a UAV experiencing wind velocity at a specific location can be difficult for a machine that doesn't recognize visual cues for wind velocity. Human pilots can identify visual cues of wind velocity at the landing location and can determine to tilt the UAV into the wind if necessary, to land the UAV within the correct landing zone. Accordingly, to train a machine to recognize the visual cues for wind velocity includes gathering flight data from UAVs. The flight data may include image data indicating wind conditions, flight control setting, and landing accuracy. The flight data may be used to train one or more machine learning (ML) models or algorithms Additionally, machine learning models can also be trained to classify unknown data as a type of data among different types of data that correspond to visual cues for wind speed and/or wind direction. For example, the machine learning model(s) may be trained using training data that includes samples of flight data labeled with varying conditions experienced at the time of descent including the wind velocity, the flight control setting, and the landing accuracy. Once trained, these model(s) can be pushed to UAVs to process image data and determine estimate wind speed and wind direction. Based on the estimated wind speed and wind direction, a UAV may determine the appropriate flight control setting to use for the UAV as the altitude changes to generate the side force to overcome the wind velocity. For example, if an algorithm using image data from a particular UAV estimates a strong wind from the west, the UAV may adjust the flight control setting to tilt the UAV into the wind with intentional over-correct at higher altitude as it descends, and the tilt may gradually decrease as the UAV gets closer to the ground. After completing the landing, the UAV may collect all data associated with the landing, including its landing accuracy based on using the estimated wind speed and wind direction, and transmit the collected flight data to a computing device to further refine or train the machine learning model(s).

Implementations of the techniques and systems described herein can improve existing technologies (e.g., autonomous navigation technologies), and can improve the functioning of the systems with respect to conventional systems. In particular, the implementations described herein allow an autonomous navigation system that runs trained ML models on a UAV to determine wind conditions from image data on its own rather than relying on weather data in which it may not have access or that is not applicable to the specific landing zone. The UAV may leverage image data to optimize or improve landing efficiency. Additionally, by having the UAV continuously gather flight data, this system provides a faster way to gather additional training data to improve the system and mitigates the adverse impacts, such as reducing the cost and energy required to collect and label the vast quantities data needed to train ML models. Additionally, as the models become more sophisticated, the UAV may reduce data transmission based on relevant data such as image data indicating visual cue for wind velocity or flight data based on poor landing accuracy, thus saving network resources. These techniques will be described in more detail below.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein can be practiced in distributed computing environments, such as a service provider network, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a schematic diagram of an illustrative environment 100 including an unmanned aerial vehicle (UAV) collecting flight data, which may include image data indicating a wind velocity and landing accuracy of the UAV, and sending the flight data to computing device(s) for analysis. The environment 100 includes one or more UAV(s) 102 that may originate at a fulfillment center and that may be deployed for flight to a landing location 106, such as a location associated with a recipient of a package transported by the UAV(s) 102. The UAV(s) 102 may receive some flight information and/or commands from the computing device(s) 112. The computing device(s) 112 may communicate with the UAV(s) 102 via a wireless network(s) 110. The UAV(s) 102 may also, at times, conduct autonomous flight, such as during takeoff, landing, or intervals between communications from the computing device(s) 112 and/or when communication with the computing device(s) 112 is not available.

The UAV(s) 102 may collect flight data 108 including image data 104 at the landing location 106, and other data associated with weather conditions, such as by determining a wind speed and direction, precipitation, temperature, fog or visibility, and/or other weather information using onboard sensor(s). Aside from wind conditions, additional factors may affect a particular landing. These additional factors may include the UAV size, the UAV weight, ground obstacles, weather, landing zone altitude, air temperature, air pressure, visibility, and the overall situation. Accordingly, the sensors may collect information related to some of these factors. The sensors may include one or more imagers including, for example, RGB-cameras, monochrome cameras, intensity (grey scale) cameras, infrared cameras, ultraviolet cameras, depth cameras, video cameras, or stereo cameras. Additionally, the sensors may include anemometers, barometer, and thermometer. This information may be shared with the computing device(s) 112, other UAVs, other vehicles, and/or other entities. The UAV(s) 102 may also use this information locally, as discussed herein.

The UAV(s) 102 may also exchange information with other UAVs, such as weather data or image data associated with weather conditions collected from the other UAVs, as well as exchange information with other weather collection devices, either directly or indirectly (e.g., through the computing device(s) 112). Although, not always available, when available the other weather collection devices may provide additional flight data 108. The other weather collection devices may include local weather stations and/or weather aggregators. The local weather stations may be weather poles, weather balloons, and/or other devices that are stationed in the environment to directly sense and/or measure weather, such as wind speed, precipitation, fog or visibility, temperature, and/or other weather information. The weather aggregators may include resources or entities that combine weather information from multiple inputs (e.g., from the local weather stations, from UAVs and/or from the vehicles), to create weather forecasts and/or provide real-time weather information for a region. The weather aggregators may be weather reporting companies, cloud computing service weather aggregators, and/or other entities.

The UAV(s) 102 may receive, generate, store, and/or implement a flight plan, which may be initially created by the computing device(s) 112 and/or by the UAV(s) 102 prior to flight of the UAV(s) 102. The flight plan may be stored in memory of the UAV(s) 102, or may be received, obtained, or streamed from a remote device, and causes the UAV(s) 102 to fly to the landing location 106, such as by traveling through waypoints tracked by a global positioning system (GPS) receiver of the UAV(s) 102. The flight plan may be initially created using weather data, such as a weather forecast provided by the weather aggregator. The flight plan may include altitude information, and thus be three-dimensional. For example, a flight plan may be created to cause the UAV(s) 102 to fly over or under a weather system and/or other physical objects, as well as around the weather system/physical objects depending on flight capabilities of the UAV(s) 102 and other possible constraints.

During approach, descent, and/or landing, the UAV(s) 102 may collect real-time data including the image data 104, which may be collected by sensors onboard the UAV(s) 102. The real-time data may also include data from other devices, as discussed above, such as the other UAVs that are within a threshold proximity with respect to the UAV(s) 102. The real-time data may include visual cues indicative of wind conditions, precipitation, fog or visibility, temperature, and/or other weather in the environment, sensed by the various devices described above.

The UAV(s) 102 may use the image data 104 to update the flight control setting for the UAV(s) 102 and/or create one or more new landing plans for the UAV(s) 102 if wind conditions are unsafe for descending/landing at the landing location 106. For example, the UAV(s) 102 may include a flight plan that causes the UAV(s) 102 to travel to landing location 106. As it approaches the landing location 106, the algorithm may determine that the image data 104 indicates gusty wind that creates unsafe landing conditions.

In some instances, UAV(s) 102 may be directed to land at an alternate landing location and/or discontinue, at least temporarily, flight based on the real-time weather data. The UAV(s) 102 may select the alternate landing location based on various considerations. Some of the landing locations may be predetermined as optimal landing zones for various reasons, such as presence of shelter, presence of battery charging equipment, and/or for other reasons. When no predetermined landing zone is within a threshold distance from the UAV(s) 102 that is attempting to land, then the UAV(s) 102 may survey nearby landscape to determine a suitable or appropriate landing zone (e.g., a relatively hard, even surface clear of physical objects), such as using image analysis and/or other autonomous techniques that may or may not include communications with the computing device(s) 112.

The landing location 106 may be landing coordinates and may include a physical landing marker to visibly mark the landing coordinates. In some examples, the landing marker may include artificial markers or indicators like a streamer, a ribbon, a piece of yarn, or any other similar strip or piece of lightweight material that may be easily attached to the landing marker to provide visual cues to the vision-based wind estimation algorithm. After the UAV(s) 102 has landed, the landing accuracy may be determined by the distance between the actual landing location and the desired landing location. For instance, in the present example, the distance between the UAV's actual landing location and the landing location 106 may be determined to provide landing accuracy data. If the distance is within a predetermined threshold, the landing accuracy data may indicate landing error is 0. If the distance exceeds the predetermined threshold, the landing accuracy data may indicate the distance in excess of the predetermined threshold as the landing error value. In additional examples, the landing marker may include a tracker, or any other trackable device attached to the center to allow simple measurement of the distance from of the center of the landing marker, which indicates the landing location 106 to the UAV's actual landing location. In some embodiments, the landing accuracy data may include an actual location in which the UAV(s) 102 landed (e.g., GPS coordinates, longitude/latitude, etc.), a measured distance from the actual landing location to the desired landing location 106, and/or a measured distance from the actual landing location to the predetermined threshold distance from the landing location 106.

The flight data 108 may include any information and/or data gathered by the UAV(s) 102 during an approach, descent, landing, and takeoff. When the UAV(s) 102 is within threshold proximity to the landing location 106, the UAV(s) 102 may enter a landing stage and perform landing sequences including gathering sensor data to prepare and continuously monitor the wind condition at the UAV(s) 102 during landing. In various examples, the UAV(s) 102 may exit the landing stage when the UAV(s) 102 has landed and completed landing checks or when the UAV(s) 102 has determined that landing at the present time is not feasible and switches back to traveling stage. The flight data 108 may include the data gathered for the time interval of the entire landing stage, which may include starting from the beginning of the landing stage until the end of the landing stage by either completed or aborted landing. In additional examples, the flight data 108 may include the data gathered for the time interval of the entire takeoff stage, which may include starting from the beginning of the takeoff stage until the end of the takeoff stage by either completed or aborted takeoff. For instance, as the UAV(s) 102 is within threshold proximity to the landing location 106, the UAV(s) 102 may analyze image data of the ground to verify there is a suitable landing surface (e.g., not blocked by cars or other large objects, not unstable surface such as a pond, etc.). In the present example, the UAV(s) 102 analyze image data to determine if there are any crosswind and may adjust any flight control settings to counter the crosswind. If there is a landing marker, the UAV(s) 102 may continually adjust flight control settings to center itself onto the landing marker. In various examples, flight data 108 may include sensor data (e.g., altitude, air pressure, images, etc.) and flight control settings for the time interval.

The computing device(s) 112 may be configured to train machine learning models for the UAV(s) 102. The computing device(s) 112 may be any type of server, such as a network-accessible dedicated server or cloud server. In at least one example, the computing device(s) 112 may include components that may control the UAV(s) 102. For example, the computing device(s) 112 may include training data 114 to train one or more ML model(s) 116 to be transmitted to the UAV(s) 102, where the ML model(s) 116, trained or untrained, are used in conjunction with one or more flight control algorithms. The computing device(s) 112 may be configured to use the one or more trained ML model(s) 116 to classify data (either incoming flight data 108, already-stored flight data 108, or both) as a type of data indicative visual cue for wind conditions.

Administrative users may operate one or more devices including one or more of the UAV(s) 102 and the computing device(s) 112. In some examples, the administrative users may label or collect the training data 114 to guide the ML models 116 to process image data (e.g., image data 104) received from the UAV(s) 102. In additional examples, the administrative users may receive and monitor both the image data received from the UAV(s) 102 and the flight data 108 that is being analyzed at computing device(s) 112 to verify that the ML models 116 are correctly identifying visual cues of wind conditions from the image data. In various examples, the flight data 108 may include wind sensor data (e.g., from an anemometer) to provide ground truth data for the ML models 116 to determine the confidence level for the predicted weather velocity. The confidence level may be determined based on the comparing the accuracy of the predicted weather velocity with respect to the ground truth data (e.g., wind velocity measured by the anemometer).

As a non-limiting example, the example image data 118 illustrates a small sample of image data that may be included in flight data 108 collected by one or more landings. The output of the machine learning model(s) 116—which processes unknown data (e.g., flight data 108) as a subject for classification—may include additional information, such as an object type of an object depicted in the image and/or example wind estimates 120 for each example image data 118. Although in the present example, the wind estimates 120 express or represent wind speed as a numeric metrics of miles per hour, but the wind speed may be expressed as any standard wind measurements including but not limited to knots, feet per second, meters per second, or Beaufort scale number which measures wind speed based on observations rather than accurate measurement. Additionally, in the present example, wind direction is expressed as a cardinal direction, but the wind direction may be expressed in any directional measurement including but not limited to azimuth degrees, 3-D values for (yaw, pitch, roll) or (x, y, z). In a first example, example image data 118(1) may be an image data of grass that is merely swaying slightly and may provide a visual cue of a low wind speed of 1 mph, and a direction of due north, the ML model(s) 116 may also determine a confidence score for the wind estimate 120(1) for the example image data 118(1). In a second example, example image data 118(2) may be an image data of a windsock that provides a visual cue for the wind estimate 120(2), including a wind speed of 7 mph and a direction of due east. In a third example, example image data 118(3) may be an image data of a koi windsock that provides a visual cue for the wind estimate 120(3), including a wind speed of 15 mph and a direction of due west. In the last example, example image data 118(N) may be an image data of a tree that provides a wind estimate 120(N), including a wind speed of 28 mph and a direction of due east.

Figure 2:
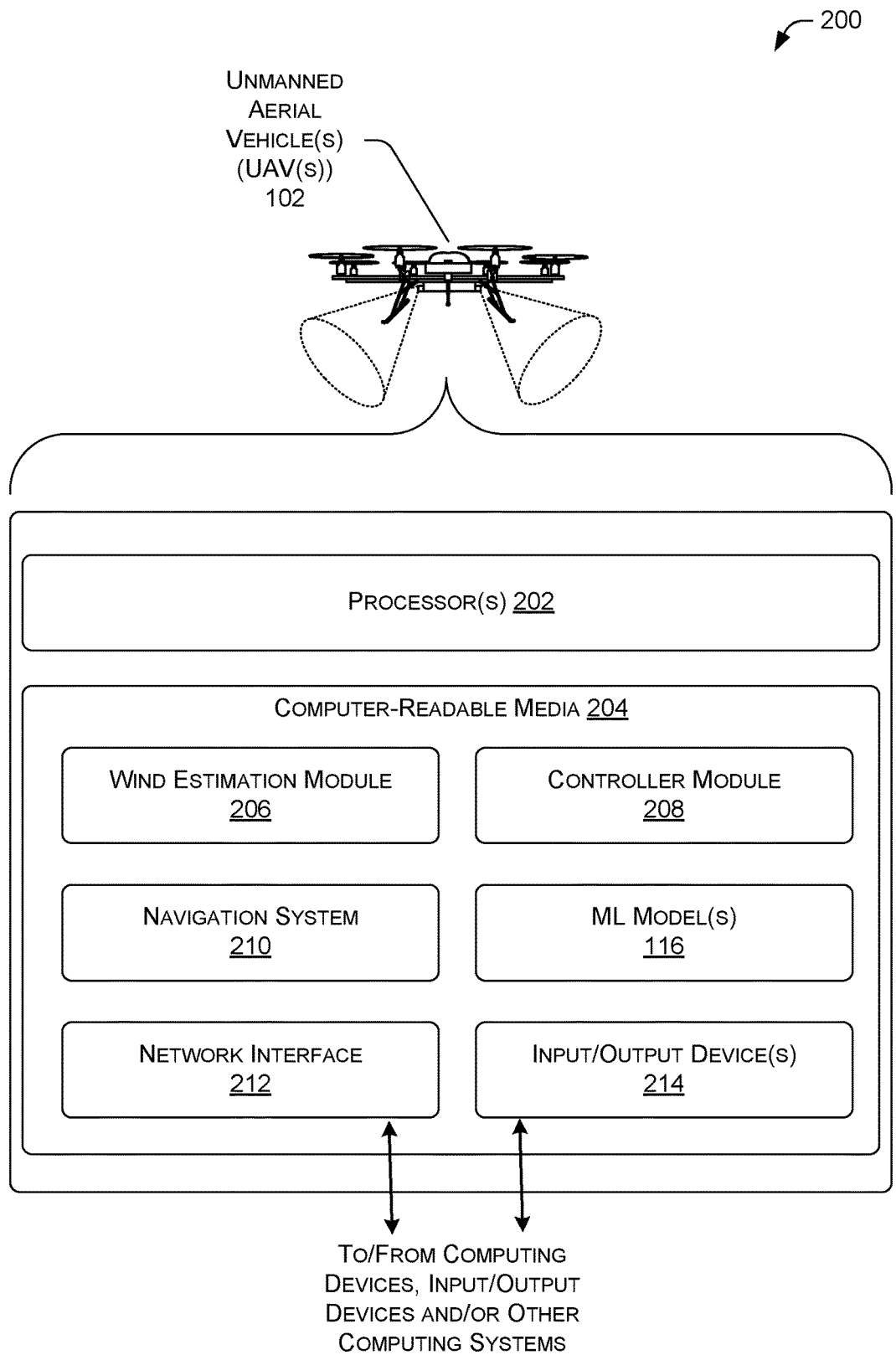
FIG. 2 is a block diagram of an illustrative UAV architecture.

FIG. 2 is a block diagram of an illustrative UAV architecture 200 of the UAV(s) 102. The UAV architecture 200 may be used to implement the various systems, devices, and techniques discussed above. In the illustrated implementation, the UAV architecture 200 includes one or more processors 202 coupled to a non-transitory computer readable media 204. The UAV architecture 200 may also include a wind estimation module 206, a controller module 208, and/or a navigation system 210. The UAV architecture 200 further includes a network interface 212, and one or more input/output device(s) 214.

In various implementations, the UAV architecture 200 may be implemented using a uniprocessor system including one processor 202, or a multiprocessor system including several processors 202 (e.g., two, four, eight, or another suitable number). The processor(s) 202 may be any suitable processor capable of executing instructions. For example, in various implementations, the processor(s) 202 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 202 may commonly, but not necessarily, implement the same ISA.

The non-transitory computer readable media 204 may be configured to store executable instructions/modules, data, flight paths, and/or data items accessible by the processor(s) 202. In various implementations, the non-transitory computer readable media 204 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable memory. In other implementations, program instructions, data and/or flight paths may be received, sent or stored upon different types of computer-accessible media, such as non-transitory media, or on similar media separate from the non-transitory computer readable media 204 or the UAV architecture 200. Generally speaking, a non-transitory, computer readable memory may include storage media or memory media such as flash memory (e.g., solid state memory), magnetic or optical media (e.g., disk) coupled to the UAV architecture 200. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 212.

The wind estimation module 206 may assist the controller module 208 to determine the flight control setting for the UAV(s) 102 due to wind conditions. The wind estimation module 206 may leverage computer vision from images gathered by an imaging device of the UAV(s) 102. This system leverages computer vision, which is the field of artificial intelligence that trains computers to interpret and understand the visual world by using digital images from cameras and videos and deep learning models. Using computer vision, this system may train one or more machine learning (ML) model(s) 116 to enable machines to accurately identify and classify objects that provides visual cues for wind condition. Using the one or more trained ML model(s) 116, the wind estimation module 206 may analyze the images for visual cues indicating wind velocity and determine an estimate wind speed and wind direction.

In various examples, the wind estimation module 206 may use the one or more trained ML model(s) 116 to estimate the wind conditions from image data and may also collect new training data to retrain the one or more trained ML model(s) 116. Initially, the system may collect training data from stored data of all the flights taken by the UAV(s) 102. The system may identify training data that includes flight data (e.g., flight data 108 from FIG. 1) from the stored data of all the flights. The training data may include flight data with the UAV(s) 102 trying to on a landing marker. In particular, the training data may include flight data for the UAV(s) 102 that continually adjust the flight control settings to center itself onto the landing marker and the image data indicating the wind conditions during the landing stage. The UAV(s) 102 experiencing crosswind may change its orientation to counter any wind velocity on it, while UAV(s) 102 under normal landing conditions without crosswind may landing normally (e.g., descending straight downward vertically) without changing its orientation. The system may measure the control effort exerted by the UAV(s) 102 to counter the wind velocity based on the flight control settings. For instance, the UAV(s) 102 may have default flight control settings that it uses under normal landing conditions without wind velocity acting on the UAV(s) 102. The control effort may be determined from the amount of adjustments made to the default flight control settings including any adjustments made to the orientation or power to the propellers of the UAV(s) 102. For example, on a calm day, the UAV(s) 102 may land using its default flight control settings and the control effort may be 0. The system may use flight data, including the image data indicating wind conditions and flight control settings indicating control effort, as input to train one or more ML model(s) 116. In some examples, the one or more ML model(s) may determine estimate wind velocity based on the control effort exerted by the UAV(s) 102. The one or more trained ML model(s) may include a wind estimation algorithm to estimate wind velocity from image data input and may include a landing control algorithm to determine flight control settings from wind velocity input.

The controller module 208 communicates with the navigation system 210 and adjusts the power of each propeller motor to guide the UAV(s) 102 along a predetermined flight path. As described herein, the one or more trained ML model(s) may include a wind estimation algorithm to estimate wind velocity from image data input and may include a landing control algorithm to determine flight control settings from wind velocity input. The controller module 208 may receive estimates of wind speed and wind direction and determine flight control settings including adjustments to the orientation of the UAV(s) 102 or the power of the propeller motor to counter the wind velocity acting on the UAV(s) 102. For instance, based on the predicted wind velocity, the controller module 208 may tilt the UAV(s) 102 into the wind, or the controller module 208 may change the power to one or more propeller to the generate a side force to counter the wind velocity. The controller module 208 may make changes in a direction or conduct of flight based on the information from the wind estimation module 206 without necessarily receiving a change in the flight plan.

The navigation system 210 may include a GPS or other similar system that can be used to navigate the UAV(s) 102 to and/or from a location. The navigation system 210 communicates with the one or more sensors to acquire image data as needed. For example, when the UAV(s) 102 is positioned over a landing marker at a delivery location, the navigation system 210 may provide an instruction to a sensor to analyze images for a landing marker.

The network interface 212 may be configured to allow data to be exchanged between the UAV architecture 200, other devices attached to a network, such as other computer systems, and/or with UAV control systems of other UAVs. For example, the network interface 212 may enable wireless communication between numerous UAVs. In various implementations, the network interface 212 may support communication via wireless general data networks, such as a Wi-Fi network. For example, the network interface 212 may support communication via telecommunications networks such as cellular communication networks, satellite networks, and the like.

Input/output device(s) 214 may, in some implementations, include image capture devices, infrared sensors, time of flight sensors, accelerometers, lights, speakers, and other input/output devices commonly used in aviation. Multiple input/output device(s) 214 may be present and controlled by the UAV architecture 200. One or more of these sensors may be utilized to assist in landings as well as avoiding obstacles during flight.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV architecture 200 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The UAV architecture 200 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV architecture 200. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the UAV architecture 200 may be transmitted to the UAV architecture 200 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium. Accordingly, the techniques described herein may be practiced with other UAV control system configurations.

Additional information about the operations of the modules of the UAV(s) 102 is discussed below with reference to the flow diagrams.

Figure 3:
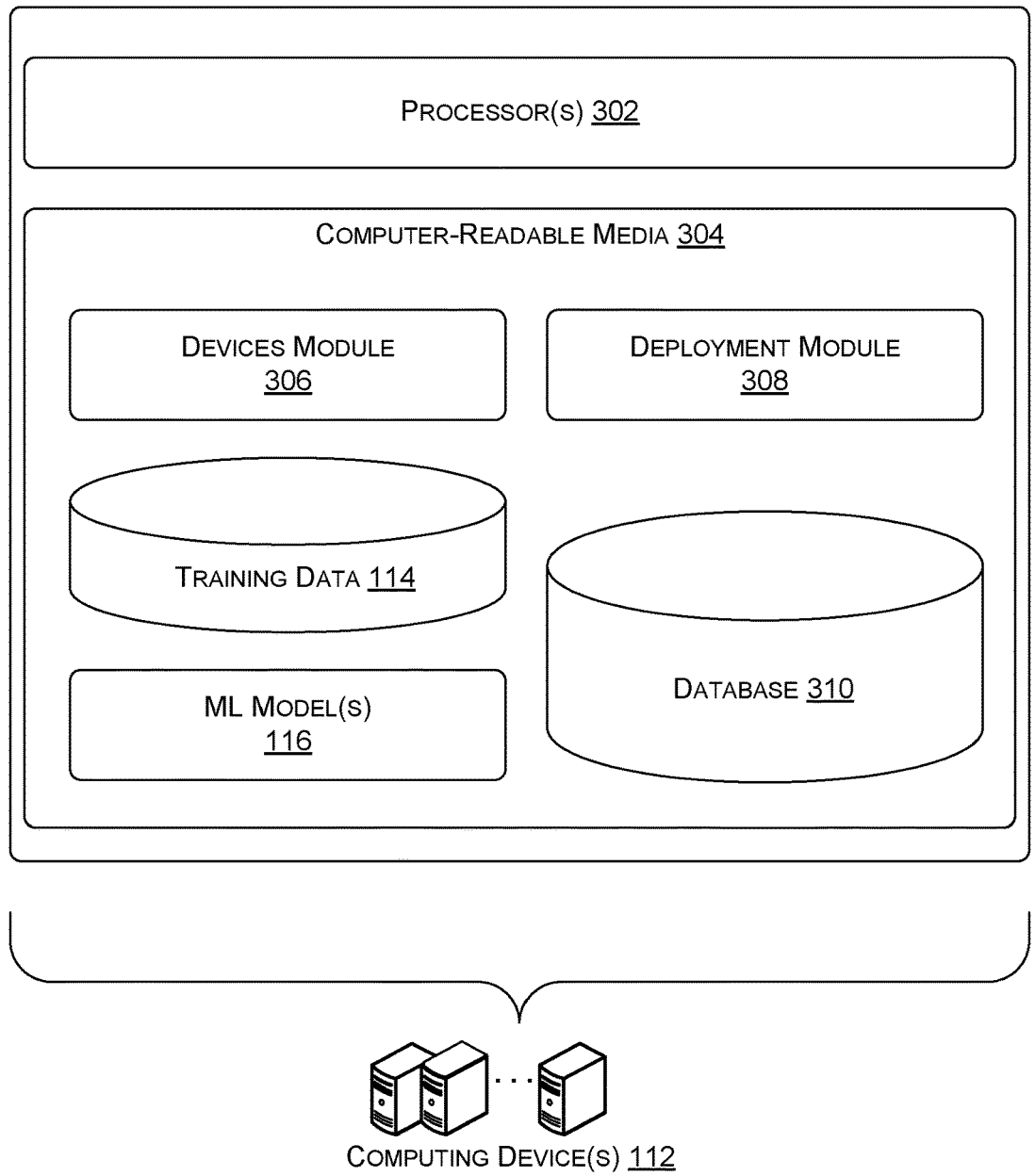
FIG. 3 is a block diagram of an illustrative computing architecture of the computing device(s) shown in FIG. 1.

FIG. 3 is a block diagram of an illustrative computing architecture 300 of the computing device(s) 112 that exchanges communications with the UAV(s) 102. The computing architecture 300 may include one or more processors 302 and one or more computer-readable media 304 that stores various modules, applications, programs, or other data. The computer-readable media 304 may include instructions that, when executed by the one or more processors 302, cause the processors to perform the operations described herein for the computing device(s) 112. The architecture 300 may also include network communication devices to facilitate communication with other devices, such as using wired and/or wireless networks.

The computer-readable media 304 may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media appropriate for storing electronic instructions. In addition, in some examples the computer-readable media 304 may include a transitory computer-readable signal (in compressed or uncompressed form). Examples of computer-readable signals, whether modulated using a carrier or not, include, but are not limited to, signals that a computer system hosting or running a computer program may be configured to access, including signals downloaded through the Internet or other networks. The order in which the operations are described is not intended to be construed as a limitation, and any number of the described operations may be combined in any order and/or in parallel to implement the process. Furthermore, the operations described below may be implemented on a single device or multiple devices.

As shown in FIG. 3, in some configurations, the computer-readable media 304 may store the devices module 306, training data 114, the machine learning (ML) model(s) 116, the deployment module 308, and the database 310, which are described in turn. The components may be stored together or in a distributed arrangement.

The devices module 306 may manage and keep track of the UAV(s) 102 that are authorized to send training data to the computing device(s) 112. As discussed herein, the size and weight for each of the UAV(s) 102 may affect a landing. Accordingly, the devices module 306 may track the vehicle type (e.g., make, model, etc.) for each of the UAV(s) 102 for the flight controllers to factor in the size and weight of the vehicle when adjusting the flight control settings. In some examples, the devices module 306 may track the UAV(s) 102 and the vehicle type that feeds data into the training data 114, so that the ML model(s) 116 sent to a particular UAV(s) 102 may be tailored to the specific vehicle type. For example, a large UAV, a UAV having a first shape, or a UAV having a first number/type of propellers may compensate for side forces differently than a small UAV, a UAV having a second, different shape, or a UAV having a second, different number/type of propellers, and each vehicle type may not need all the trained ML model(s) 116 and/or data for the different UAV types.

The deployment module 308 may interact with the devices module 306 to transmit the latest trained ML model(s) 116 to the UAV(s) 102. As described above, not all of the UAV(s) 102 need the same ML model(s) 116 and data for every UAV(s) 102, thus the deployment module 308 may send ML model(s) 116 and data as needed. Initially, the deployment module 308 may send the same one or more trained ML model(s) 116 to the UAV(s) 102, without regard to the vehicle type, to serve as a wind estimation algorithm. As the one or more trained ML model(s) 116 is retrained and refined by additional training data, the one or more trained ML model(s) 116 may generate different versions of wind estimation algorithm and landing control algorithm for different vehicle types based on factoring the weight and size of the UAV(s) 102. In various examples, the deployment module 308 may verify authorization of the UAV(s) 102 before receiving data from the UAV(s) 102 and determine if the UAV(s) 102 should receive an updated ML model 116. The deployment module 308 may also receive data from the UAV(s) 102 after verifying that the UAV(s) 102 have the correct version of ML model(s) 116 in order to perform/estimate accurate wind estimates. In additional examples, if the system uses a cascade of ML model(s) 116, the deployment module 308 may determine to send only specific updated ML model(s) 116.

The computing device(s) 112 may have access to the UAV(s) 102 and the data stored therein, for various purposes. One of these purposes is to create training data 114 for training one or more of the ML models 116 (sometimes referred to herein as "machine learning algorithms" 116). The training data 114 may be created by labeling (or tagging) and/or gathering specific samples of flight data maintained by the UAV(s) 102 and/or computing device(s) 112. The labels applied to the samples of flight data may indicate different types of data that correspond to different relevance levels of the samples of flight data. For example, a first data object may include image data of a solid stationary object such as a building, which is not a useful indicator of wind condition, thus may be labeled as not (or less) relevant. While plants or other objects demonstrating visual cues when a wind velocity is applied to it may be labeled as high (or higher) relevance. The relevance of a particular object with respect to application of a wind velocity may be represented by one or more values, numbers, characters, symbols, and so on. For instance, provided that the relevance is represented on a scale of 0.0 to 1.0, with 0.0 being not relevant and 1.0 having the highest relevance, a stationary object such as a building may have a relevance of 0.0, a tree having branches or leaves may have a relevance of 0.7, and a flag of a relatively lightweight material may have a relevance of 0.9.

In various examples, the computing device(s) 112 may collect training data 114 from stored data of all the flights taken by the UAV(s) 102. The computing device(s) 112 may identify training data 114 that includes flight data (e.g., flight data 108 from FIG. 1) from the stored data of all the flights. The training data 114 may include flight data with the UAV(s) 102 trying to land on a landing marker. In particular, the training data 114 may include flight data for the UAV(s) 102 that continually adjust the flight control settings to center itself onto the landing marker and the image data indicating the wind conditions during the landing stage. The UAV(s) 102 experiencing crosswind may change its flight control settings including its orientation to counter any wind velocity acting on it, while UAV(s) 102 under normal landing conditions without crosswind may landing normally (e.g., descending straight downward vertically) without changing its standard landing settings or its orientation. The computing device(s) 112 may measure the control effort exerted by the UAV(s) 102 to counter the wind velocity based on the flight control settings. For instance, the UAV(s) 102 may have default landing flight control settings that it uses under normal landing conditions without wind velocity acting on the UAV(s) 102. The control effort may be determined from the amount of adjustments made to the default landing flight control settings including any adjustments made to the orientation or power to the propellers of the UAV(s) 102. For example, on a calm day, the UAV(s) 102 may land using its default landing flight control settings and the control effort may be 0. The computing device(s) 112 may use flight data, including the image data indicating wind conditions and flight control settings indicating control effort, as input to train one or more ML model(s) 116. In various examples, the flight data may include data collected by wind condition measuring sensors, including anemometer and/or weather vane, to provide ground truth data as input to further train the one or more ML model(s) 116. The ground truth data may be used the one or more ML model(s) 116 to determine the confidence level of the algorithm. In some examples, the one or more trained ML model(s) 116 may include a wind estimation algorithm to determine estimate wind velocity from image data input and may include a landing control algorithm to determine flight control settings from wind velocity input.

Machine learning generally involves processing a set of examples (called "training data" 114) in order to train a machine learning model 116. A machine learning model 116, once trained, is a learned mechanism that can receive new data as input and estimate or predict a result as output. For example, a trained machine learning model 116 can comprise a classifier that is tasked with classifying unknown input (e.g., an unknown image) as one of multiple class labels (e.g., labeling the image as a grass or a tree). In the context of the present disclosure, the unknown input may include, inter alia, data that is to be handled according to its level of relevance, and the trained machine learning model (s) 116 may be tasked with classifying the unknown input (a subject for classification) as one of multiple class labels. The unknown data may include an image(s), a video(s), multimedia, etc. Thus, the trained machine learning model(s) 116 may be configured with text recognition, image recognition, and other functionality to process unknown data with various types of content. The class labels, in this case, may correspond to a classification of the unknown data as a type of data among multiple different types of data corresponding to different relevance levels.

In some examples, particular ML model(s) 116 may specifically reside on computing device(s) 112 to classify data and to determine if the data includes a new object. For example, a certain ML model 116 can comprise a k-Nearest Neighbors (kNN) classifier to classify the data received from the UAV(s) 102. Because a kNN classifier requires a relatively large corpora of data to run, it would not be feasible to deploy this particular ML model(s) 116 to the smaller UAV(s) 102. Nonetheless, when computing device(s) 112 receive data, from the UAV(s) 102, that was labeled as containing a new object type, the kNN classifier may verify the new object type. For example, the system may have only a few images of a particular type of bird, but the trained ML model(s) 116 that was sent to the UAV(s) 102 may not include a class label for this particular type of bird because the number of images does not constitute enough data for the trained ML model(s) 116 to recognize the object. However, when the data is received at the remote computing device(s) 112, the kNN classifier may determine that it has already classified this particular type of bird but, due to the low number of data samples, the system may have low confidence in its ability to correctly label this object.

In some examples, the trained machine learning model(s) 116 may be configured to classify a set of data generated by different sensors of the same device into the same types of data at varying levels of relevance. For example, a UAV's performance may be highly affected by wind and weather, thus if conditions were extremely hot, cold, foggy, or windy, the data generated by temperature sensors, wind sensors, power sensors, and/or imaging devices may be similarly classified as highly relevant. That is, the classification of data generated by one sensor may cause the data generated by a different sensor on the same device to be higher on the relevance level.

The machine learning model(s) 116 may represent a single model or an ensemble of base-level machine learning models and may be implemented as any type of machine learning model 116. For example, suitable machine learning models 116 for use with the techniques and systems described herein include, without limitation, supervised learning, unsupervised learning, tree-based models, k-Nearest Neighbors (kNN), support vector machines (SVMs), kernel methods, neural networks, random forests, splines (e.g., multivariate adaptive regression splines), hidden Markov model (HMMs), Kalman filters (or enhanced Kalman filters), Bayesian networks (or Bayesian belief networks), expectation maximization, genetic algorithms, linear regression algorithms, nonlinear regression algorithms, logistic regression-based classification models, or an ensemble thereof. An "ensemble" can comprise a collection of models 116 whose outputs (classifications) are combined, such as by using weighted averaging or voting. The individual machine learning models of an ensemble can differ in their expertise, and the ensemble can operate as a committee of individual machine learning models that is collectively "smarter" than any individual machine learning model of the ensemble.

As mentioned, the output(s) of the machine learning model(s) 116—which processes unknown data as a subject for classification—may include, inter alia, a classification of the unknown data as a type of data among different types of data corresponding to indicators of wind speed or wind direction. The output may include additional information as well, such as flight control settings to overcome side forces from the wind, and the like.

The database 310 may store at least some data including, but not limited to, data collected from the devices module 306, the training data 114, the ML model(s) 116, and the deployment module 308, including data associated with flight data, flight data, UAV data, and image data. In some examples, the data may be automatically added via a computing device (e.g., UAV(s) 102, computing device(s) 112). The UAV data may also include feature details of each UAV, the maintenance schedule, and in cases for autonomous vehicles, the task history. In additional or alternative examples, at least some of the data may be stored in a storage system or other data repository.

Figure 4:
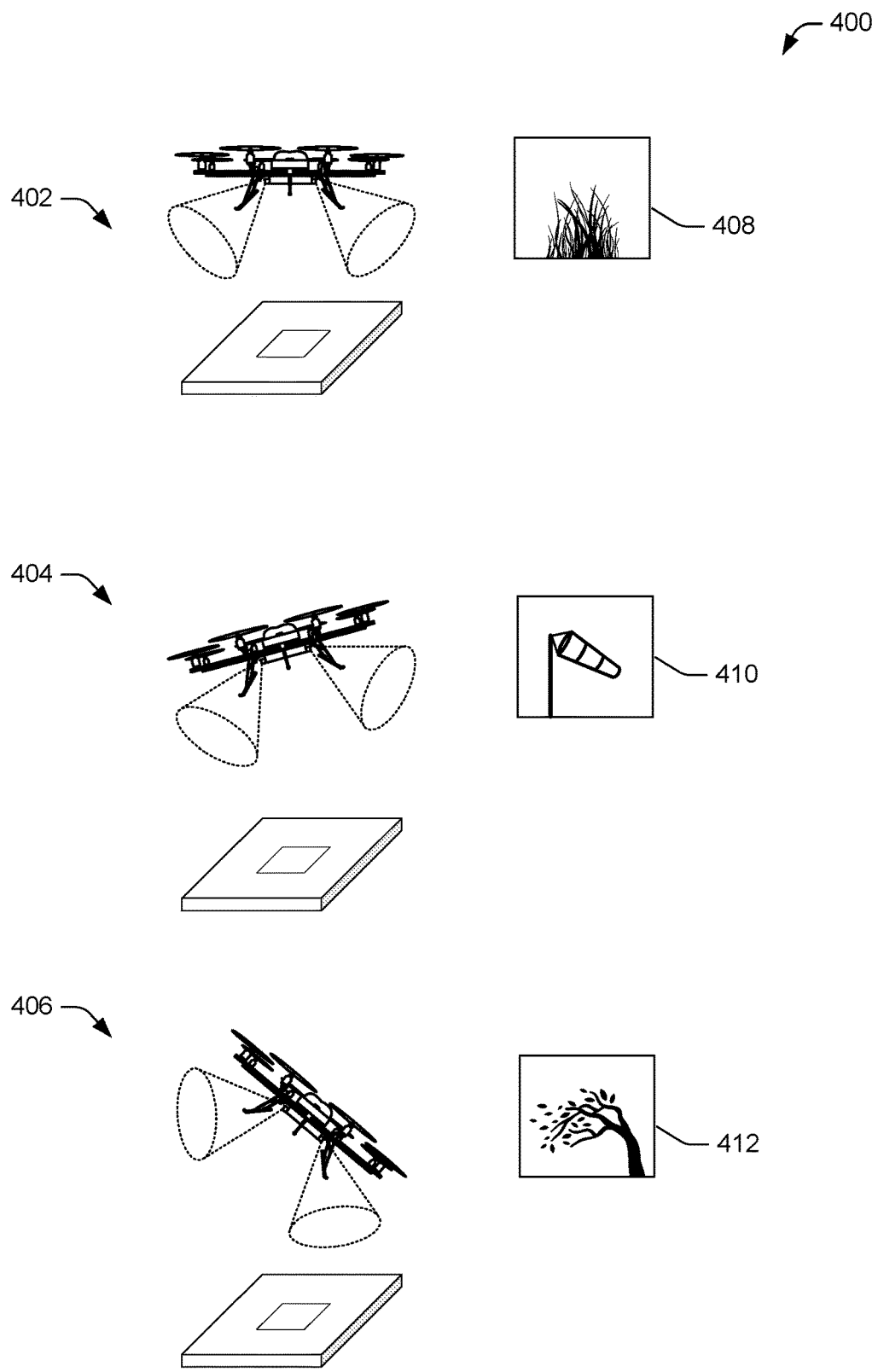
FIG. 4 is a schematic diagram showing example application of using visual cues from image data to determine flight control settings for UAVs.

FIG. 4 is a schematic diagram showing an example application 400 of using visual cues from image data to determine flight control settings for UAVs. The example application 400 is a non-limiting example regarding how the visual cues in image data detected by the UAVs may be analyzed by the ML model(s) 116 running on the UAV(s) 102 and/or the computing device(s) 112. The example application 400 may include the example flight control 402, the example flight control 404, the example flight control 406, the example image data 408, the example image data 410, and the example image data 412.

In the example flight control 402, the wind estimation module 206 may use ML model(s) 116 to analyze the example image data 408 to determine wind conditions at the landing location. The example image data 408 illustrates grass that is not moving and not bent from wind velocity. The output of the machine learning model(s) 116 may determine a low wind speed and an unknown wind direction, thus the flight control setting for the UAV is to land without changes to orientation.

In the example flight control 404, the wind estimation module 206 may use ML model(s) 116 to analyze the example image data 410 to determine wind conditions at the landing location. The example image data 410 illustrates a windsock that is pointing towards the east and the windsock is fully extended (e.g., appears nearly horizontal). The output of the machine learning model(s) 116 may determine a wind speed of 2 and the windsock pointing due east indicates a western wind, thus the flight control setting for the UAV is to tilt slightly into the western wind. As described herein, in the present example, the wind speed is represented as a numeric metrics of miles per hour, but the wind speed may be expressed as any standard wind measurements including but not limited to knots, feet per second, meters per second, or Beaufort scale number which measures wind speed based on observations rather than accurate measurement.

In the example flight control 406, the wind estimation module 206 may use ML model(s) 116 to analyze the example image data 412 to determine wind conditions at the landing location. The example image data 412 illustrates a tree that is heavily bent due west from a strong wind velocity. The output of the machine learning model(s) 116 may determine a high wind speed of 5 and eastern wind, thus the flight control setting for the UAV is to tilt heavily into the eastern wind.

Figure 5:
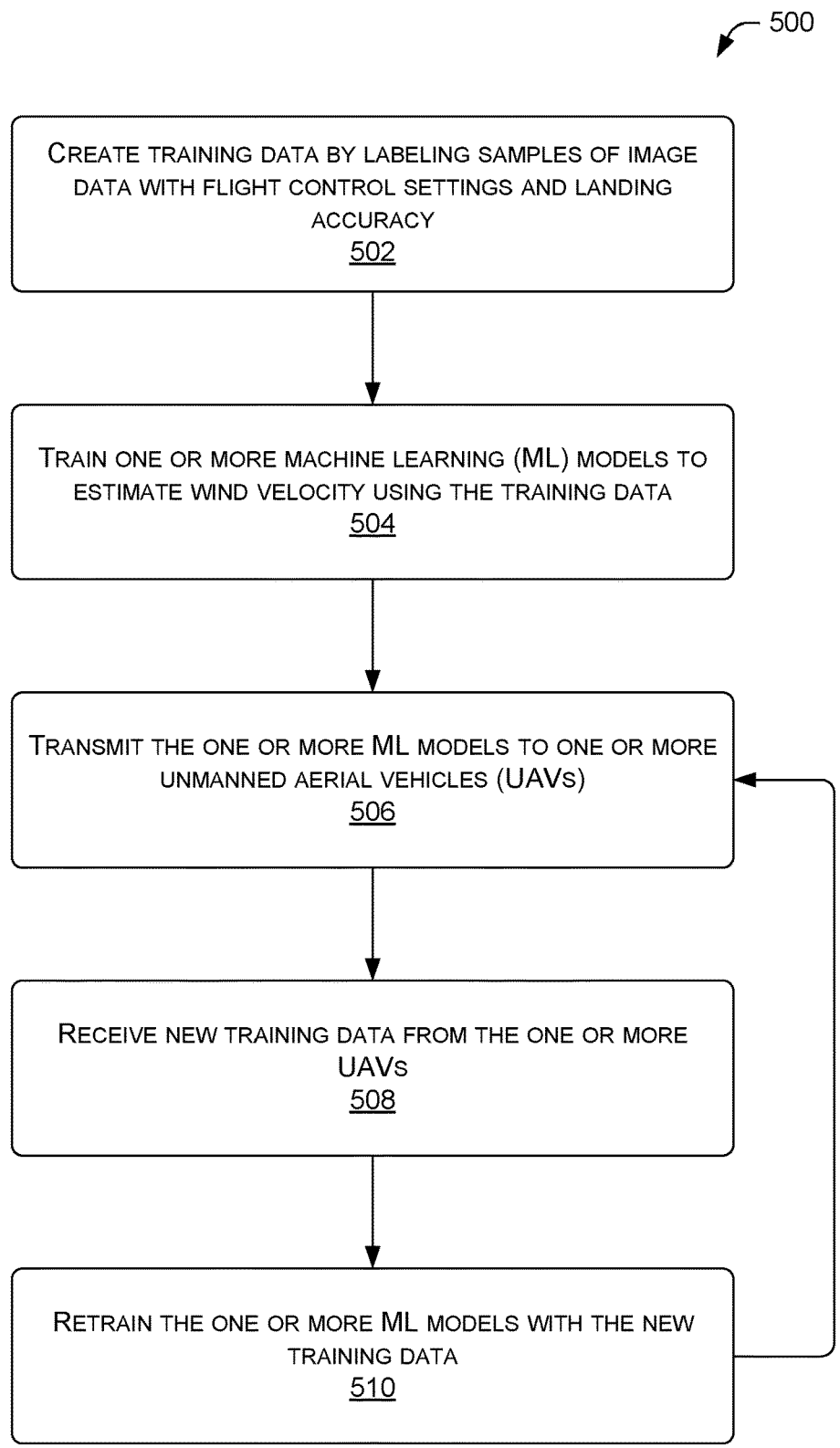
FIG. 5 is a flow diagram of an illustrative process for training machine learning models to estimate wind velocity and to retrain the machine learning models using subsequently received/determined data.
Figure 6:
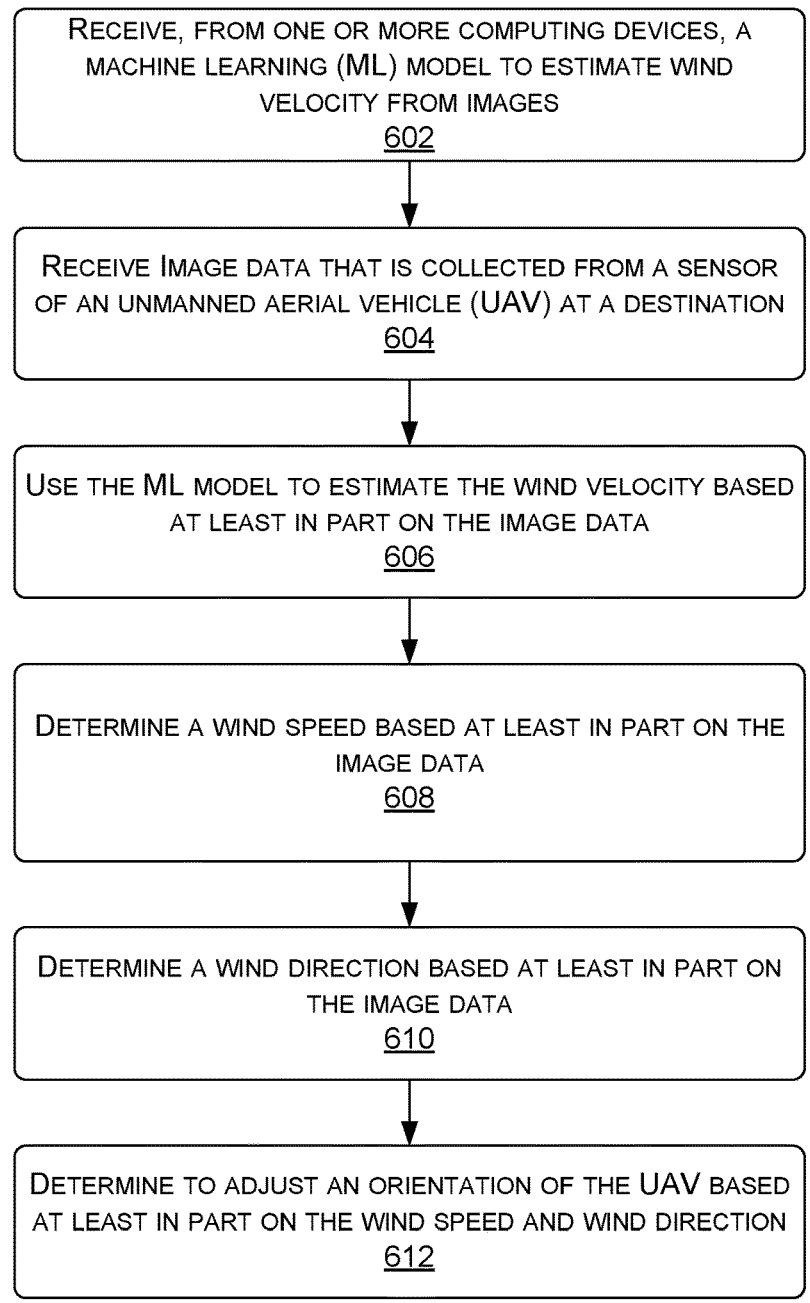
FIG. 6 is a flow diagram of an illustrative process for applying trained machine learning models to determine wind speed and wind direction for landing a UAV.

FIGS. 5 and 6 are flow diagrams of illustrative processes. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The processes discussed below may be combined in any way to create derivative processes that are still within the scope of this disclosure.

FIG. 5 is a flow diagram of an illustrative process 500 for training machine learning models to estimate wind velocity and to further train the machine learning models. The process 500 is described with reference to the system 100 and may be performed by the UAV(s) 102 and/or in cooperation with any one or more of computing device(s) 112. Of course, the process 500 may be performed in other similar and/or different environments.

At 502, the computing device(s) 112 may create training data by collecting flight data including image data and flight control settings. The computing device(s) 112 may collect training data from stored data of all the flights taken by the UAV(s) 102. The computing device(s) 112 may identify training data that includes flight data from the stored data of all the flights. The training data may include flight data with the UAV(s) 102 trying to land on a landing marker. In particular, the training data may include flight data for the UAV(s) 102 that continually adjust the flight control settings to center itself onto the landing marker and the image data indicating the wind conditions during the landing stage.

At 504, the computing device(s) 112 may train one or more machine learning (ML) models to estimate wind velocity using the training data. The UAV(s) 102 experiencing crosswind may change its orientation to counter any wind velocity acting on it, while UAV(s) 102 under normal landing conditions without crosswind may landing normally (e.g., descending straight downward vertically) without changing its orientation. The computing device(s) 112 may measure the control effort exerted by the UAV(s) 102 to counter the wind velocity based on the flight control settings. For instance, the UAV(s) 102 may have default flight control settings that it uses under normal landing conditions without wind velocity acting on the UAV(s) 102. The control effort may be determined from the amount of adjustments made to the default flight control settings including any adjustments made to the orientation or power to the propellers of the UAV(s) 102. For example, on a calm day, the UAV(s) 102 may land using its default flight control settings and the control effort may be 0. The computing device(s) 112 may use flight data, including the image data indicating wind conditions and flight control settings indicating control effort, as input to train one or more ML model(s) 116. The one or more trained ML model(s) 116 may include a wind estimation algorithm to determine estimate wind velocity from image data input and may include a landing control algorithm to determine flight control settings from wind velocity input.

At 506, the deployment module 308 may transmit the one of more ML models to one or more unmanned aerial vehicles (UAVs). As described herein, not all of the UAV(s) 102 need the same ML model(s) 116 and data for every UAV(s) 102, thus the deployment module 308 may send ML model(s) 116 and data as needed. Initially, the deployment module 308 may send the same one or more trained ML model(s) 116 to the UAV(s) 102, without regard to the vehicle type, to serve as a wind estimation algorithm. As the one or more trained ML model(s) 116 is retrained and refined by additional training data, the one or more trained ML model(s) 116 may generate different versions of wind estimation algorithm and landing control algorithm for different vehicle types based on factoring the weight and size of the UAV(s) 102. In various examples, the deployment module 308 may verify authorization of the UAV(s) 102 before receiving data from the UAV(s) 102 and determine if the UAV(s) 102 should receive an updated ML model 116.

At 508, the deployment module 308 may receive new training data from the one or more UAVs. The deployment module 308 may verify authorization of the UAV(s) 102 and determine if the UAV(s) 102 is to be updated. In some examples, the deployment module 308 may also receive data from the UAV(s) 102 after verifying that the UAV(s) 102 has the correct version of ML model(s) 116.

At 510, computing device(s) 112 may retrain the one or more ML models with the new training data. The machine learning model 116, once trained, is a learned mechanism that can receive new data as input and estimate or predict a result as output. Additionally, the machine learning model 116 may return to process 506 to transmit the latest trained ML model(s) 116 to UAV(s) 102, receive new training data back from the UAV(s) 102, and retrain the ML model(s) 116 to continuously improve the ML models 116 in this data processing loop.

FIG. 6 is a flow diagram of an illustrative process 600 for applying trained machine learning models to determine wind speed and wind direction for descent of landing of a UAV. The process 600 is described with reference to the system 100 and may be performed by the UAV(s) 102 and/or in cooperation with any one or more of computing device(s) 112. Of course, the process 600 may be performed in other similar and/or different environments.

At 602, the wind estimation module 206 may receive, from one or more computing devices, a machine learning model to estimate wind velocity from images. The current UAV(s) 102 may register itself with a computing device(s) 112 to receive the latest version of the ML model(s) 116 to help determine if the data gathered by the UAV(s) 102 may be useful as training data.

At 604, the wind estimation module 206 may receive image data that is collected from a sensor of an unmanned aerial vehicle (UAV). The wind estimation module 206 may receive image data that is collected from an image sensor of a UAV that is hovering over, or that is in proximity to, a predetermined landing location.

At 606, the wind estimation module 206 may use the ML model to estimate the wind velocity based at least in part on the image data. As described herein, the wind estimation module 206 may use the one or more trained ML model(s) 116 to estimate the wind conditions from image data and may also collect new training data to retrain the one or more trained ML model(s) 116. The system may use flight data, including the image data indicating wind conditions and flight control settings indicating control effort, as input to train one or more ML model(s) 116. In some examples, the one or more ML model(s) 116 may determine estimate wind velocity based on the control effort exerted by the UAV(s) 102. The one or more trained ML model(s) may include a wind estimation algorithm to estimate wind velocity from image data input and may include a landing control algorithm to determine flight control settings from wind velocity input.

At 608, the wind estimation module 206 may determine a wind speed based at least in part on the wind velocity. As described above, the wind estimation module 206 may use one or more trained ML model(s) 116 to estimate the wind velocity based on analyzing the image data. The wind velocity may include the wind speed and wind direction.

At 610, the wind estimation module 206 may determine a wind direction based at least in part on the wind velocity. As described above, the wind estimation module 206 may use one or more trained ML model(s) 116 to estimate the wind velocity by analyzing the image data. The wind velocity may include the wind speed and wind direction.

At 612, the controller module 208 may determine to adjust an orientation of the UAV based at least in part on the wind speed and wind direction. The controller module 208 communicates with the navigation system 210 and adjusts the power of each propeller motor to guide the UAV(s) 102 along a predetermined flight path. As described herein, the one or more trained ML model(s) may include a wind estimation algorithm to estimate wind velocity from image data input and may include a landing control algorithm to determine flight control settings from wind velocity input. Accordingly, the controller module 208 may receive estimates of wind speed and wind direction and may use the one or more trained ML model(s) to determine flight control settings including adjustments to the orientation of the UAV(s) 102 or the power of the propeller motor to counter the wind velocity acting on the UAV(s) 102.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer-implemented method comprising:
    generating first training data associated with a plurality of unmanned aerial vehicles (UAVs), the first training data being generated based on first flight data received from the plurality of UAVs, the first flight data including:
        first images captured by cameras of the plurality of UAVs during descent and landing onto predetermined landing locations, and
        first flight control settings used by individual UAVs of the plurality of UAVs during the descent and landing in response to wind velocity experienced by the individual UAVs during the descent and landing onto the predetermined landing locations;
    training, using the first training data and to generate one or more trained machine learning (ML) models, one or more ML models to analyze images to estimate the wind velocity;
    transmitting the one or more trained ML models to at least a portion of the plurality of UAVs to cause first adjustment of the first flight control settings;
    generating second training data associated with the at least the portion of the plurality of UAVs, the second training data being generated based on second flight data received from the at least the portion of the plurality of UAVs, the second flight data including:
        second images captured by the cameras of the at least the portion of the plurality of UAVs during the descent and landing,
        second estimate wind velocity based on applying the one or more trained ML models on the second images,
        second flight control settings used by the at least the portion of the plurality of UAVs to adjust orientation during the descent and landing based on the second estimate wind velocity, and
        landing accuracy of the second flight control settings based on actual landing locations of the at least the portion of the plurality of UAVs and corresponding predetermined landing locations;
    retraining, to generate one or more retrained ML models, the one or more trained ML models using the second training data; and
    transmitting the one or more retrained ML models to the at least the portion of the plurality of UAVs to cause second adjustment of the second flight control settings.

2. The computer-implemented method as recited in claim 1, wherein determining a landing accuracy of a flight control setting is based on a distance between an actual landing location of a UAV using the flight control setting and a predetermined landing location of the predetermined landing locations.

3. The computer-implemented method as recited in claim 1, wherein the plurality of UAVs are associated with one or more UAV types and the at least the portion of the plurality of UAVs is associated with a UAV type of the one or more UAV types.

4. The computer-implemented method as recited in claim 1, wherein the one or more retrained ML models are used to adjust estimate wind velocity and in response, change an associated flight control setting.

5. The computer-implemented method as recited in claim 1, wherein a landing location of the predetermined landing locations includes a landing marker and an artificial indicator of visual cue for wind conditions, the artificial indicator including one of a streamer, a piece of yarn, or a ribbon.

6. A system comprising:
    one or more processors; and
    memory storing computer-executable instructions that, when executed, cause the one or more processors to:
        receive, from one or more computing devices, a machine learning (ML) model used to estimate wind velocity from one or more images that depict one or more objects experiencing wind and determine, based at least in part on estimating the wind velocity from the one or more images, a flight control setting of an unmanned aerial vehicle (UAV) associated with a UAV type;
        receive image data that is collected from a sensor of the UAV that is within a threshold distance from a predetermined landing location;
        estimate, by applying the ML model to the image data, the wind velocity associated with the predetermined landing location;
        determine at least one of an estimated wind speed or an estimated wind direction based at least in part on the wind velocity; and
        adjust the flight control setting of the UAV during at least one of descent or landing at the predetermined landing location based at least in part on applying the ML model associated with the UAV type to the at least one of the estimated wind speed or the estimated wind direction.

7. The system as recited in claim 6, wherein the computer-executable instructions, when executed, further cause the one or more processors to:
   determine a distance between an actual landing location of the UAV and the predetermined landing location; and
   determine a landing accuracy based at least in part on the distance.

8. The system as recited in claim 7, wherein the computer-executable instructions when executed, further cause the one or more processors to:
   transmit flight data to the one or more computing devices, the flight data including at least one of the image data, the landing accuracy, the flight control setting of the UAV, the estimated wind speed, or the estimated wind direction.

9. The system as recited in claim 8, wherein the computer-executable instructions, when executed, further cause the one or more processors to:
   receive, from the one or more computing devices, a new or updated ML model based at least in part on transmitting the flight data.

10. The system as recited in claim 6, wherein the predetermined landing location includes a landing marker and an artificial indicator of visual cue for wind conditions, the artificial indicator including one of a streamer, a piece of yarn, or a ribbon.

11. The system as recited in claim 6, wherein determining to adjust the flight control setting of the UAV is further based at least in part on a current altitude of the UAV.

12. A method comprising:
   receiving, from one or more computing devices, a machine learning (ML) model used to estimate wind velocity from one or more images and determine, based at least in part on estimating the wind velocity from the one or more images, a flight control setting of an unmanned aerial vehicle (UAV) associated with a UAV type;
   receiving image data that is collected from a sensor of the UAV that is within a threshold distance from a predetermined landing location;
   estimating, by applying the ML model to the image data, a wind velocity associated with the predetermined landing location;
   determining an estimated wind direction based at least in part on the wind velocity; and
   adjusting the flight control setting for the UAV based at least in part on applying the ML model associated with the UAV type to the estimated wind direction.

13. The method as recited in claim 12, wherein the flight control setting includes a control effort to be exerted by the UAV in opposition of the estimated wind direction.

14. The method as recited in claim 12, further comprising determining an estimated wind speed based at least in part on the wind velocity, wherein determining the flight control setting is further based at least in part on the estimated wind speed.

15. The method as recited in claim 14, further comprising determining to abort a landing the UAV based at least in part on the estimated wind direction and the estimated wind speed.

16. The method as recited in claim 14, further comprising determining an alternate landing location for the UAV based at least in part on the image data.

17. The method as recited in claim 12, further comprising:
   determining a distance between an actual landing location of the UAV and the predetermined landing location; and
   determining a landing accuracy based at least in part on the distance.

18. The method as recited in claim 17, further comprising:
   determining that the landing accuracy is below a threshold; and
   transmitting, to the one or more computing devices, flight data including at least one of the image data, the landing accuracy, the flight control setting, and the wind velocity.

19. The method as recited in claim 18, further comprising receiving, from the one or more computing devices, a second machine learning (ML) model.

20. The method as recited in claim 13, wherein the flight control setting includes adjusting at least one of a yaw, a pitch, or a roll to tilt the UAV toward the estimated wind direction.

* * * * *